United States Patent [19]

Burton

[11] 4,299,253
[45] Nov. 10, 1981

[54] PULSATION DAMPENER

[75] Inventor: James A. Burton, Houston, Tex.

[73] Assignee: Hydril Company, Los Angeles, Calif.

[21] Appl. No.: 97,538

[22] Filed: Nov. 26, 1979

[51] Int. Cl.³ ............................................. F16L 55/04
[52] U.S. Cl. ..................................... 138/30; 138/26;
    181/206; 73/430; 73/707
[58] Field of Search ..................... 138/26, 30; 181/167,
    181/206; 73/707, 430

[56] References Cited

U.S. PATENT DOCUMENTS

| 2,407,276 | 9/1946 | Hendel et al. | 138/26 |
| 2,727,470 | 12/1955 | Ludwig | 138/26 X |
| 2,936,041 | 5/1960 | Sharp et al. | 181/206 |
| 3,061,039 | 10/1962 | Peters | 138/30 X |
| 3,581,773 | 6/1971 | Warren | 73/707 X |
| 4,195,668 | 4/1980 | Lewis | 138/30 |
| 4,222,414 | 9/1980 | Achener | 138/30 |

FOREIGN PATENT DOCUMENTS 275001  2/1968  U.S.S.R. ................................. 138/30

*Primary Examiner*—James E. Bryant, III
*Attorney, Agent, or Firm*—Pravel, Gambrell, Hewitt, Kirk, Kimball & Dodge

[57] ABSTRACT

A pulsation dampener providing high attenuation in a narrow quiet band or frequency. The pulsation dampener is tuned to provide a reflected wave 180° out of phase in the narrow band to cancel the undesired pulsation. A silicone polymer contained by a diaphragm is used as the dampening fluid. The pulsation dampener operation is virtually unaffected by changes in working fluid pressure or density. The latter aspect makes the pulsation dampener particularly well suited for use in well drilling operations where pressure pulses in the drilling fluid are used to transmit information to the surface.

1 Claim, 2 Drawing Figures

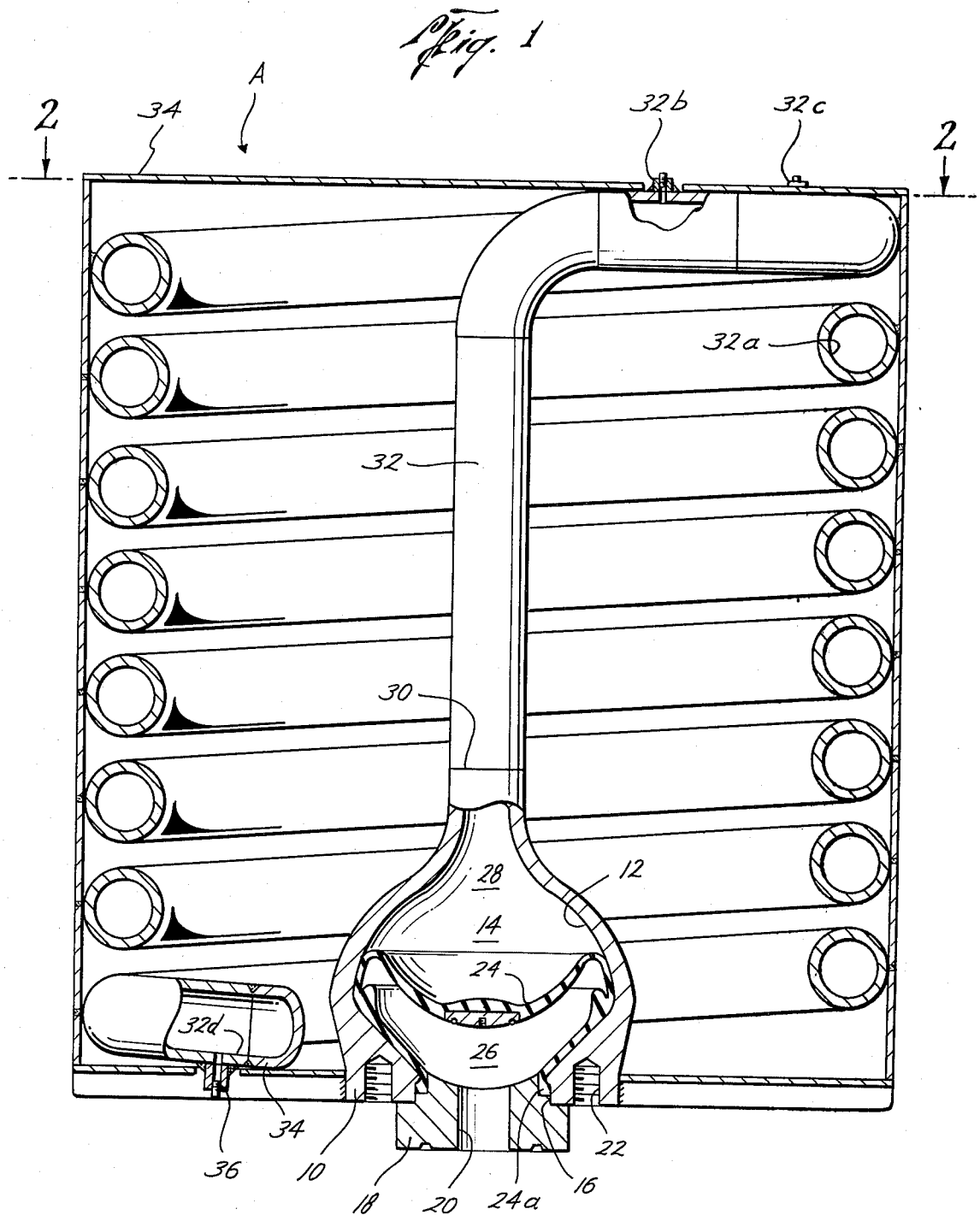

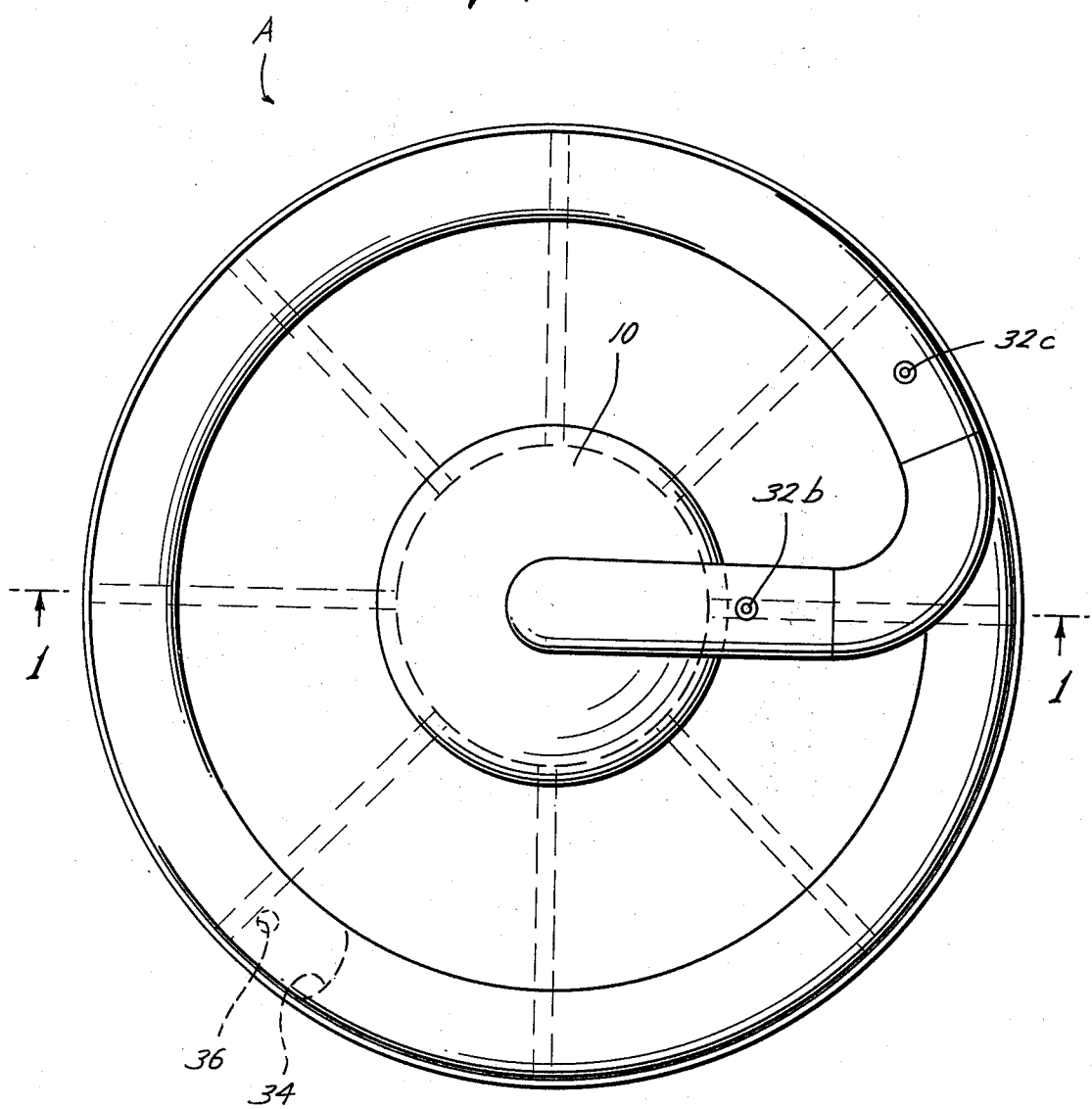

PULSATION DAMPENER

TECHNICAL FIELD

The present invention relates to pulsation dampeners and more particularly to pulsation dampeners that are tuned to provide high attenuation at a narrow frequency range. By creating a narrow frequency quiET band, pressure pulses in the working fluid can be used to reliably transmit information. The present invention is particularly adapted for use in well drilling operations where subsurface information can be transmitted to the surface through the circulating drilling fluid on a continuous basis without interrupting well drilling operations.

CROSS REFERENCE TO RELATED APPLICATIONS

The subject matter of the present application is related to the pulsation dampener disclosure in my co-pending patent applications that are also assigned to the assignee of the present invention, Hydril Company. My related applications are as follows: Ser. No. 955,929 filed Oct. 30, 1978, now U.S. Pat. No. 4,186,776; and Ser. No. 34,773 filed Apr. 30, 1979.

BACKGROUND ART

In my application Ser. No. 34,773, there is disclosed a high pressure pulsation dampener surge absorber that uses a silicone base liquid as the dampening media rather than a compressed gas. Reference is hereby made for incorporating the entire disclosure of Ser. No. 34,773 including the discussion of background art therein in this application as well as that of Ser. No. 955,929 as if fully set forth herein.

Nongas pulsation dampeners, such as disclosed in U.S. Pat. No. 3,731,709 are known. In general, they have employed internal guides for changing flow direction and which will change their frequency dampening characteristics with changes in working fluid density.

During well drilling operations it is desirable to obtain information from tools connected downhole in the drill string. In fact, it is desirable to obtain such information on a continuous basis without interfering with well drilling operations. To obtain such information in the past it was often necessary to shut down drilling operations while a tool was run downhole to determine the desired information, such as borehole deviation from vertical. To overcome this disadvantage, downhole tools have been developed to signal such information to the surface using pressure pulses in the circulating drilling fluid. As the instruments at the surface reading such pressure pulses have been unable to distinguish between the pressure pulse signals and the pressure pulses originating in the discharge of the positive displacement circulating pumps, such signal systems have been unreliable.

DISCLOSURE OF THE INVENTION

The present invention relates to pulsation dampeners.

The disclosed pulsation dampener is provided with the usual diaphragm that separates the pressure vessel into two chambers or zones, one of which is communicated with the working fluid having the undesired pulsations. An elongated tube having an inner bore communicating with the other zone is secured at one end to the pressure vessel and closed at the other end to reflect a pressure wave. A silicone liquid having a low bulk modulus and which is noncorrosive to the pressure vessel is used in the second zone for absorbing the pulsation. By preselecting the length of the tube, a specific frequency band can be attenuated by the reflected wave which is returned 180° out of sequence or phase from the silicone liquid for effecting cancellation of the pressure pulsations and providing a high attenuation in a quiet band or zone. For convenience and minimizing unit size, the pulsation dampener tube is formed in a helical coil. By providing high attenuation in a preselected quiet zone, pressure pulse signals may be reliably transmitted in the quiet zone. This is particularly useful for transmission of information from downhole tools during well drilling operations.

BRIEF DESCRIPTION OF THE DRAWINGS

FIG. 1 is a side view, partially in section, of a pulsation dampener constructed in accordance with the present invention; and FIG. 2 is a view taken along lines 2—2 of FIG. 1.

BEST MODE FOR CARRYING OUT THE INVENTION

The pulsation dampener of the present invention is generally designated A in the Figs. and includes a generally spherical pressure vessel shell 10 having an inner surface 12 defining a fluid containing cavity 14. The pressure vessel shell 10 is provided with an opening 16 in which is secured an inlet nozzle 18 having a flow passage 20 for permitting ingress and egress of working fluid such as drilling fluid having the pulsation or surges into the cavity 14. The inlet nozzle 18 is secured to the working fluid pressure system piping (not illustrated) by suitable known means such as equi-circumferentially spaced tapped bolt receiving openings 22.

Disposed within the cavity 14 is a flexible diaphragm bladder 24 for dividing the cavity 14 into a first or lower expansible zone 26 for the pulsating working fluid and an upper or second expansible zone 28. The diaphragm 24 is provided with an annular lip 24a for securing and sealing the diaphragm to the pressure vessel shell 10 and the inlet nozzle 18. With this arrangement the metal pressure vessel shell 10 is continuously protected from contact with the potentially corrosive working fluid.

The pressure vessel shell 10 is provided with a second opening 30 above the diaphragm 24. Secured to the pressure vessel 10 adjacent the opening 30 is a first end of an elongated tube 32 having an internal opening or bore 32a in communication with the upper zone 28 of the cavity 14. The tube 32 extends upwardly from the pressure vessel 10 for forming a helical coil that extends downwardly exteriorly of the pressure vessel 10 to a second end 32b. Secured to the end 32b in the elongated tube is an end cap 34 that is secured to the tube 32 by suitable means such as welding for enclosing the tube bore 32a. A drain plug 36 is provided adjacent the end 32b for voiding the tube interior 32a when desired. A pair of suitable fill plugs 32b and 32c are provided in the upper portion of the tube 32 for filling the tube interior 32a and the upper zone 28 when desired. The tube 32 and pressure vessel 10 are preferably mounted within a housing 34.

The upper zone is filled with a predetermined amount of the liquid state silicone fluid or silicone polymer having a low bulk modulus which is noncorrosive and nontoxic. Bulk modulus being the ratio of applied hydrostatic pressure to change in volume (volume strain).

The low bulk modulus of the silicone liquids compared to other liquids enables a certain amount of compressibility for dampening the working fluid in the lower zone 26. The nontoxic characteristic is desirable from a personnel safety standpoint. The silicone fluids also have good thermal conductivity and a high flash point which further increases their safety. The thermal conductivity prevents any heat buildup which could damage the diaphragm 24 and the high flash point in limiting ignition in the event the pressure vessel shell 10 ruptures. Silicone fluids particularly well adapted for this use because of the above desirable properties are General Electric Polydimethylsiloxane No. GE-SF-18-350, and Dow Corning No. 200-350 Silicone. The liquid filling of the upper zone provides a fixed dampening response or band that is unaffected by variations in the working fluid pressure. This is unlike gas changed dampeners.

By controlling the length of the tube, the reflected pressure wave in the upper changer returns 180° out of phase for cancelling the incident pressure wave in the working fluid. This results in excellent attenuation over a narrow range of frequencies, to provide a quiet zone or band in which to transmit information acoustically. Because the density of the silicone fluid is relatively constant, changes in the density of the working fluid do not affect the frequency of the narrow band being attenuated.

Operation

In the use and operation of the present invention, the upper zone 28 above diaphragm 24 is filled with a predetermined amount of the silicone fluid using the inlets 32b and 32c in the tube 32. The vessel 10 is connected to the working fluid piping for admitting the pulsating working fluid into the lower zone 26 through the inlet 20 of the inlet nozzle 18, but the diaphragm prevents contact of the working fluid with the vessel 10.

As the working fluid pulses into the lower zone 26 it tends to be absorbed by some compression of the silicone fluid in the upper zone 28. In addition, the pressure pulses are transmitted through the inlet opening 32a of the pipe 32 where it passes through the helical spiral of the pipe 32 until the pressure wave hits the pipe closure 34. A rebound or standing wave is created by the pipe closure 34 which travels up through helical spiral of the pipe 32 and the inlet opening 32a where it will impact on the diaphragm 24 for urging on the working fluid in the first zone 26. By controlling the length of the tube 32 this reflected wave is returned 180° out of sequence with the pressure pulses for effectively cancelling the pressure pulses for effectively cancelling the pressure surges in the desired frequency range. By using a silicone fluid having a slower wave speed than the working fluid, the length of the helical coil of the pipe 32 can be shorter substantially.

In other nongas charged dampeners the working fluid is also used as the dampening fluid. While such nongas dampeners are insensitive to pressure changes, a change in the density of the working fluid also changes the high attenuation frequency band. In well drilling operations, the density of the drilling fluid is frequently changed which changes the quiet band of high attenuations and which is a serious drawback to that type of equipment. By using the working fluid density insensitive pulsation dampener of the present invention, an operator will be assured of a constant quiet zone or band where pressure pulses from the drilling fluid positive displacement circulation pumps will be highly attenuated. This will enable downhole drilling instruments to reliably signal information to the surface using fluid pressure pulses in the circulating drilling fluid within the predetermined quiet band or zone.

The foregoing disclosure and description of the invention are illustrative and explanatory thereof, and various changes in the size, shape and materials as well as in the details of the illustrated construction may be made without departing from the spirit of the invention.

I claim:

1. A compact tuned pulsation dampener apparatus for achieving high attenuation at a narrow frequency range to produce a substantially pulsation free quiet band in a working fluid for enabling transmission of information by controlled pressure pulses through the working fluid including:

a pressure vessel forming a cavity means for receiving and containing fluid under pressure in said cavity means, said pressure vessel having a first opening and a second opening formed therethrough;

an inlet nozzle disposed in said first opening and having a flow passage for permitting ingress and egress from said cavity means of working fluid subject to the undesired pressure pulses in the narrow frequency range which are to be dampened;

a flexible diaphragm disposed in said cavity for dividing said cavity means into a first zone for receiving the working fluid and a second zone for receiving and containing a second pulsation dampening liquid fluid, said first zone communicating with said flow passage of said first inlet nozzle for permitting ingress and egress of the working fluid;

an elongated tube secured at one end to said pressure vessel with an internal opening of said tube communicating with said second opening of said pressure vessel, said elongated tube formed in a helical coil of selected tuned length about said pressure vessel to minimize the installed size of the tuned pulsation dampener apparatus;

means for closing the internal opening of said tube at a second end of said tube; and a liquid state silicone pulsation dampening fluid filling said second zone and said internal opening of said tube, said silicone liquid state fluid having a preselected low bulk modulus to enable operative relative compression thereof by the working fluid and for also producing a reflected signal from the closed end of said internal opening of said tube that is tuned 180° out of phase with the incident pulsation wave in the working fluid to produce an attenuated quiet band in which selected information may be transmitted by controlled pressure pulses in the working fluid.

* * * * *